(12) United States Patent
Seo et al.

(10) Patent No.: US 11,806,802 B2
(45) Date of Patent: Nov. 7, 2023

(54) JOINING METHOD

(71) Applicant: NIPPON LIGHT METAL COMPANY, LTD., Tokyo (JP)

(72) Inventors: Nobushiro Seo, Shizuoka (JP); Keita Oikawa, Shizuoka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 140 days.

(21) Appl. No.: 17/428,517

(22) PCT Filed: Oct. 15, 2019

(86) PCT No.: PCT/JP2019/040394
§ 371 (c)(1),
(2) Date: Aug. 4, 2021

(87) PCT Pub. No.: WO2020/208844
PCT Pub. Date: Oct. 15, 2020

(65) Prior Publication Data
US 2022/0111465 A1 Apr. 14, 2022

(30) Foreign Application Priority Data
Apr. 12, 2019 (JP) ................................ 2019-076105

(51) Int. Cl.
*B23K 20/00* (2006.01)
*B23K 20/12* (2006.01)
*B23K 103/10* (2006.01)

(52) U.S. Cl.
CPC ........ *B23K 20/128* (2013.01); *B23K 20/1255* (2013.01); *B23K 20/1265* (2013.01); *B23K 2103/10* (2018.08)

(58) Field of Classification Search
CPC ............ B23K 20/1255; B23K 20/1215; B23K 20/1265; B23K 20/1225; B23K 20/125; B23K 20/122
See application file for complete search history.

(56) References Cited

U.S. PATENT DOCUMENTS 10,906,127 B2 * 2/2021 Seo .................... B23K 20/1265
2012/0193401 A1 * 8/2012 Hori .................... B23K 20/1265
228/2.1

(Continued)

FOREIGN PATENT DOCUMENTS

| CN | 20534220 U | 6/2016 |
| CN | 205342206 U | 6/2016 |

(Continued)

OTHER PUBLICATIONS

OA for corresponding CN Application No. 201980093238.4 dated Jul. 22, 2022. (15 pages, with English Translation).

(Continued)

*Primary Examiner* — Erin B Saad
(74) *Attorney, Agent, or Firm* — Merchant & Gould P.C.

(57) ABSTRACT

An object of the present invention is to provide a joining method by which metal members can be suitably joined to each other. The present invention is characterized by including a friction stirring process in which the first metal member, the second metal member, and the auxiliary member are joined to one another by moving the rotary tool along the inner corner portion in a state where the tip side pin which is being rotated is inserted into the inner corner portion, is in contact with the first metal member, the second metal member, and the auxiliary member, and an outer circumferential face of the base side pin is pressed against the auxiliary member.

4 Claims, 12 Drawing Sheets

(56) References Cited

U.S. PATENT DOCUMENTS

| | | | |
|---|---|---|---|
| 2017/0001257 A1* | 1/2017 | Seo | B23K 20/1265 |
| 2021/0146473 A1* | 5/2021 | Hori | F28F 3/12 |
| 2021/0213561 A1* | 7/2021 | Hori | B23K 20/1255 |
| 2022/0347788 A1* | 11/2022 | Hori | B23K 20/1245 |

FOREIGN PATENT DOCUMENTS

| | | |
|---|---|---|
| CN | 107931822 A | 4/2018 |
| CN | 108817650 A | 11/2018 |
| CN | 108941882 A | 12/2018 |
| CN | 109396635 A | 3/2019 |
| CN | 109551096 A | 4/2019 |
| DE | 10201005077 A1 | 7/2011 |
| EP | 3299108 A1 | 3/2018 |
| JP | 2001-321965 A | 11/2001 |
| JP | 2011-206786 A | 10/2011 |
| JP | 2016-123984 A | 7/2016 |
| JP | 2017-121639 A | 7/2017 |
| WO | 2016/186134 A1 | 11/2016 |
| WO | 2019-008785 | 1/2019 |
| WO | 2019/008787 A1 | 1/2019 |

OTHER PUBLICATIONS

Search Report for European Patent Application No. 19923730.6 (dated Sep. 30, 2022).

International Search Report for No. PCT/JP2019/040394 dated Nov. 19, 2019.

Office Action for Korean Patent Application No. 10-2021-7019094 (dated Oct. 20, 2022).

Office Action for Chinese Patent Application No. 201980093238.4 (dated Jan. 13, 2023).

* cited by examiner

| OFFSET (mm) | TILT ANGLE (°) | C-AXIS (°) | JOINING SPEED (mm/min) | ROTATIONAL SPEED (rpm) | INSERTION FORCE (N) |
|---|---|---|---|---|---|
| 0 | 0 | 45 | 100 | 3000 | 5000 |

| THROAT THICKNESS: 5.3mm | THROAT THICKNESS: 5.1mm |
|---|---|

FIG. 12

JOINING METHOD

This application is a National Stage Application of PCT/JP2019/040394, filed Oct. 15, 2019, which claims benefit of priority to Japanese Patent Application No. 2019-076105, filed Apr. 12, 2019, which applications are incorporated herein by reference. To the extent appropriate, a claim of priority is made to each of the above disclosed applications.

TECHNICAL FIELD

The present invention relates to a joining method.

BACKGROUND ART

For example, a patent literature 1 discloses an invention in which only a stirring pin of a rotary tool is inserted into an inner corner portion formed of a first metal member and a second metal member to perform friction stir welding. In a case where friction stirring is performed in a state where only a stirring pin of a rotary tool is inserted into an inner corner portion, there is a concern that the plastically fluidized material leaks to the outside to result in the metal shortage at the joining portion and lowering of the joining strength. For this reason, in this invention, an auxiliary member is disposed at the inner corner portion, and friction stir welding is performed in a state where the inner corner portion, the auxiliary member and the rotary tool are brought into contact with one another to prevent the metal shortage at the joining portion.

CITATION LIST

Patent Literature

Patent Literature 1: JP 2017-121639, A

SUMMARY OF INVENTION

Technical Problem

In the invention according to the patent literature 1, friction stirring is performed in a state where the first metal member or the second metal member, and the auxiliary member are fixed with a jig, but there is a concern that the auxiliary member is deformed so as to be separated from the first metal member or the second metal member during the friction stirring. If the auxiliary member is separated from the first metal member or the second metal member, there is a problem that an effect to resolve the metal shortage at the joining portion cannot be obtained. Furthermore, there is also a concern that the rotary tool is pushed by the auxiliary member, so that a moving route of the rotary tool deviates from the set moving route.

From such a view point, it is an object of the present invention to provide a joining method by which metal members can be suitably joined to each other.

Solution to Problem

In order to solve the problem, the present invention is characterized by a joining method by which a first metal member and a second metal member are joined to each other with use of a rotary tool, the method comprising: a butting process in which the first metal member and the second metal member are butted against each other so as to have an almost L-shaped or T-shaped cross section to form a butted portion; a disposing process in which one auxiliary member is disposed at an inner corner portion formed of the first metal member and the second metal member so that the one auxiliary member is brought into face-to-face contact with the first metal member or the second metal member; and wherein the rotary tool is provided with a base side pin and a tip side pin, and a tapered angle of the base side pin is larger than a tapered angle of the tip side pin, a friction stirring process in which the first metal member, the second metal member, and the auxiliary member are joined to one another by moving the rotary tool along the inner corner portion in a state where the tip side pin which is being rotated is inserted into the inner corner portion, is in contact with the first metal member, the second metal member, and the auxiliary member, and an outer circumferential face of the base side pin is pressed against the auxiliary member.

Furthermore, the present invention is characterized by a joining method by which a first metal member and a second metal member are joined to each other with use of a rotary tool, the method comprising: a butting process in which the first metal member and the second metal member are butted against each other so as to have an almost L-shaped or T-shaped cross section to form a butted portion; a disposing process in which an auxiliary member is disposed at an inner corner portion formed of the first metal member and the second metal member so that the auxiliary member is brought into face-to-face contact with the first metal member and the second metal member; and wherein the rotary tool is provided with a base side pin and a tip side pin, and a tapered angle of the base side pin is larger than a tapered angle of the tip side pin, a friction stirring process in which the first metal member, the second metal member, and the auxiliary member are joined to one another by moving the rotary tool along the inner corner portion in a state where the tip side pin which is being rotated is inserted into the inner corner portion, is in contact with the first metal member, the second metal member, and the auxiliary member, and an outer circumferential face of the base side pin is pressed against the auxiliary member.

According to the joining method, since friction stir welding is performed in a state where the outer circumferential face of the base side pin of the rotary tool is pressed against the auxiliary member, the auxiliary member can be prevented from being separated from the metal members. Hereby, the metal shortage at the joining portion can be certainly prevented. Furthermore, since the auxiliary member guides the rotary tool, the rotary tool can be prevented from going off the set moving route.

It is preferable that the joining method further comprises an auxiliary member removing process in which the auxiliary member is removed from the inner corner portion after the friction stirring process.

Advantageous Effects of Invention

According to the joining method according to the present invention, a suitable joining can be performed.

DESCRIPTION OF EMBODIMENTS

Figure 1:
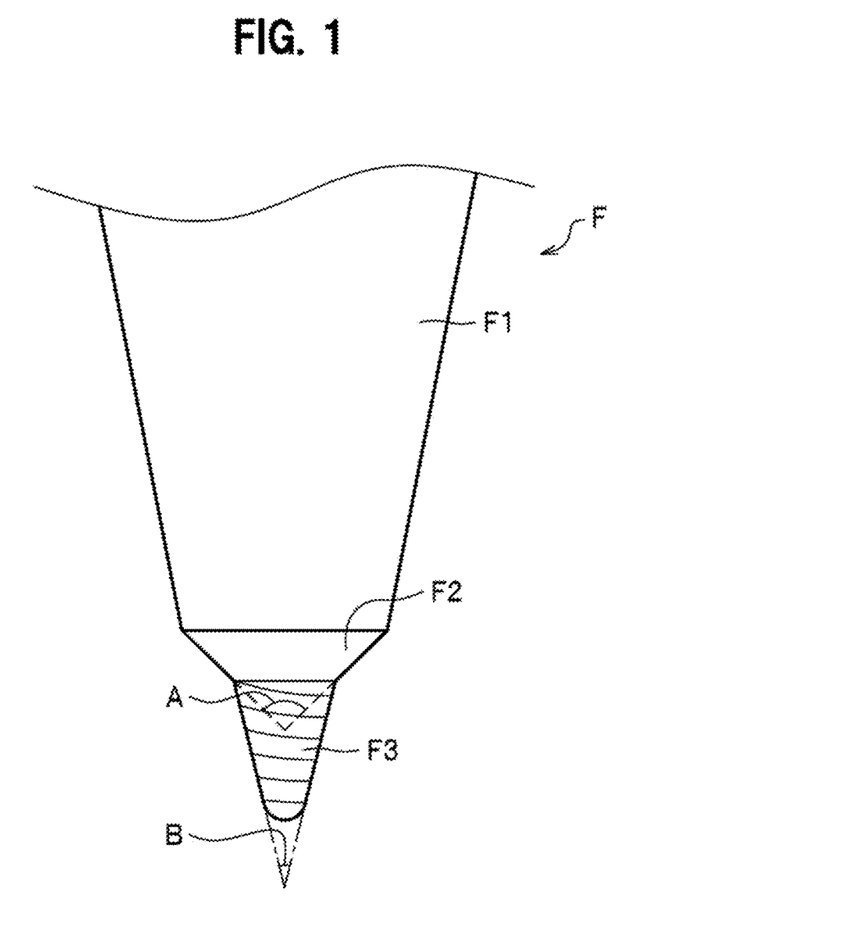
FIG. 1 is a side view showing a rotary tool according to an embodiment of a present invention.

Embodiments of the present invention will be described appropriately with reference to Figures. At first, a rotary tool which is used in a joining method according to embodiments of the present invention will be described. As shown in FIG. 1, the rotary tool F is made of, for example, a tool steel, and is mainly composed of a base portion F1, a base side pin F2, and a tip side pin F3. The base portion F1 is a portion which has a circular truncated cone shape having a smaller diameter with increasing distance toward the tip thereof and is to be connected to a spindle of a friction stirring device.

The base side pin F2 is continuous to the base portion F1 and has a smaller diameter with increasing distance toward the tip thereof. The base side pin F2 has a circular truncated cone shape. A tapered angle A of the base side pin F2 may be appropriately set, and is, for example, about 90°. The tapered angle A is larger than a tapered angle B of the tip side pin F3 to be described later. The base side pin F2 does not have a spiral groove on the outer circumferential face thereof.

As shown in FIG. 1, the tip side pin F3 is continuous to the base side pin F2, and has a smaller diameter with increasing distance toward the tip thereof. The tip side pin F3 may have a flat face at the tip thereof, but has a spherical face in the embodiments.

The tip side pin F3 has a spiral groove on the outer circumferential face thereof. The spiral groove may be clockwise or counterclockwise. In this first embodiment, the spiral groove is formed to be counterclockwise from the base end side toward the tip side because the rotary tool F is rotated clockwise.

Note that, in a case where the rotary tool F is rotated counterclockwise, it is preferable that the spiral groove is set to be clockwise from the base end side toward the tip side. Hereby, plastically fluidized material is led to the tip side through the spiral groove. Therefore, the amount of metal which leaks outside the metal members to be joined can be reduced. The rotary tool F is used to perform friction stir welding in a state attached to a friction stirring device. The rotary tool F may be attached to, for example, an arm robot equipped with a rotational driving device such as a spindle unit at the tip of the arm robot. An angle of the rotational axis of the rotary tool F can be easily changed by attaching the rotary tool F to the arm robot.

First Embodiment

Figure 2:
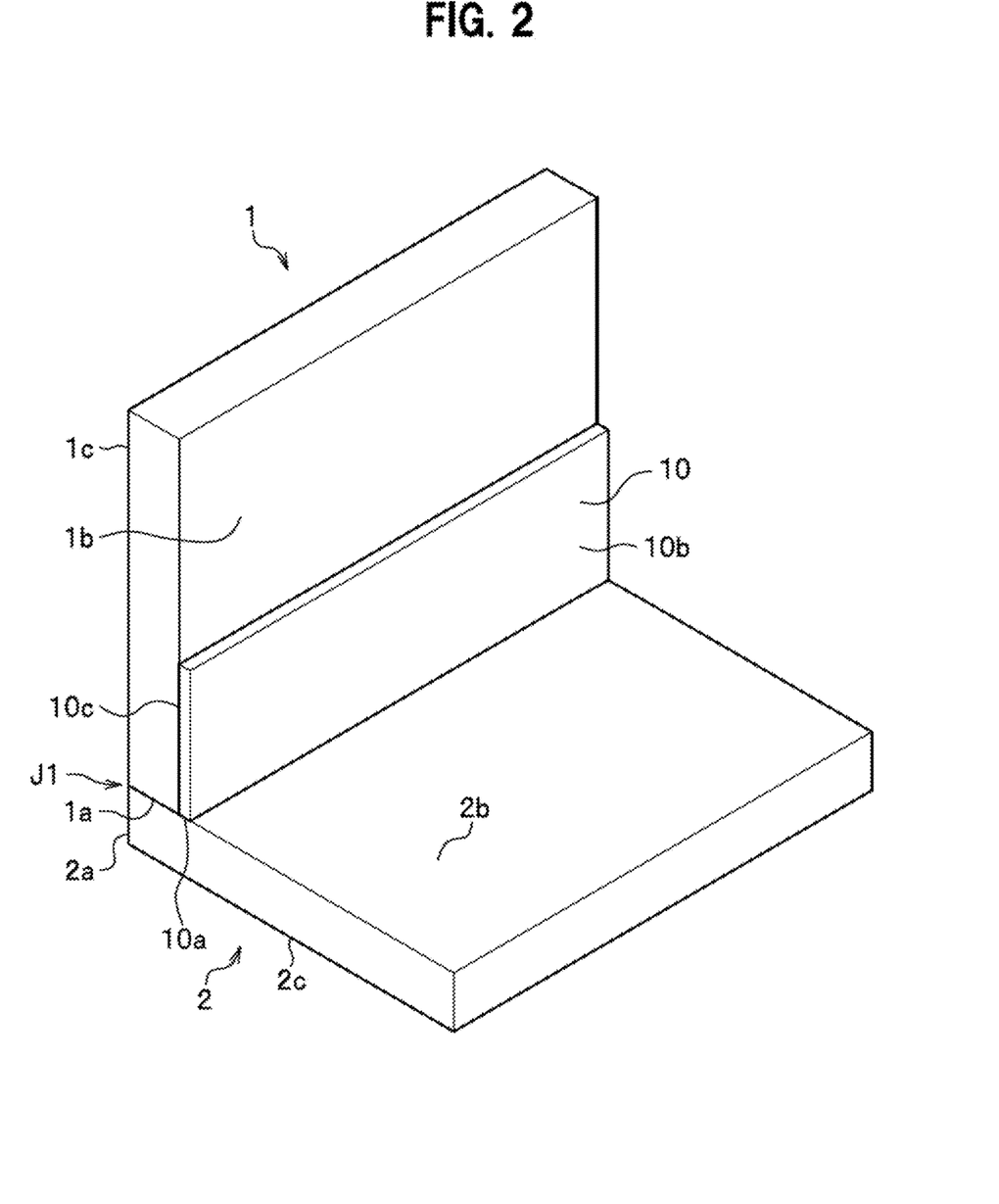
FIG. 2 is a perspective view showing a butting process and a disposing process of a joining method according to a first embodiment of the present invention.

Embodiments of the present invention will be described appropriately with reference to Figures. As shown in FIG. 2, in a joining method according to a first embodiment, friction stir welding is performed in a state where a first metal member 1 and a second metal member 2 are butted against each other to form an L-shaped cross section. In the joining method according to the first embodiment, a butting process, a disposing process, a friction stirring process, and an auxiliary member removing process are performed. Note that, a "front face" means the face opposite to a "back face" in the description of the embodiments.

The butting process is a process in which the first metal member 1 and the second metal member 2 are butted against each other. Each of the first metal member 1 and the second metal member 2 is a metal member having a plate shape. The first metal member 1 and the second metal member 2 are not particularly limited so long as each of them is a metal to which friction stirring can be performed, the metal being aluminum, an aluminum alloy, copper, a copper alloy, titanium, a titanium alloy, magnesium, a magnesium alloy, and so on. In the embodiments, each member is made of an aluminum alloy.

In the butting process, an end face 1a of the first metal member 1 and a side face 2b of the second metal member 2 are butted against each other to form a butted portion J1. Further, an inner corner portion being a corner portion having a right angle is formed of a side face 1b of the first metal member 1 and the side face 2b of the second metal member 2. A side face 1c of the first metal member 1 and an end face 2a of the second metal member 2 are flash with each other.

The disposing process is a process to dispose an auxiliary member 10 which is a plate-like member made of metal. In this embodiment, the auxiliary member 10 is made of the same material as the first metal member 1 and the second metal member 2. The auxiliary member 10 is a member to compensate the metal shortage at the joining portion and to guide the rotary tool F. In the disposing process, an end face 10a of the auxiliary member 10 is brought into contact with the side face 2b of the second metal member 2, and a back face 10c of the auxiliary member 10 is brought into face-to-face contact with the side face 1b of the first metal member 1. After disposing the auxiliary member 10, the first metal member 1, the second metal member 2, and the auxiliary member 10 are fixed not to move with use of a jig not shown.

Figure 3:
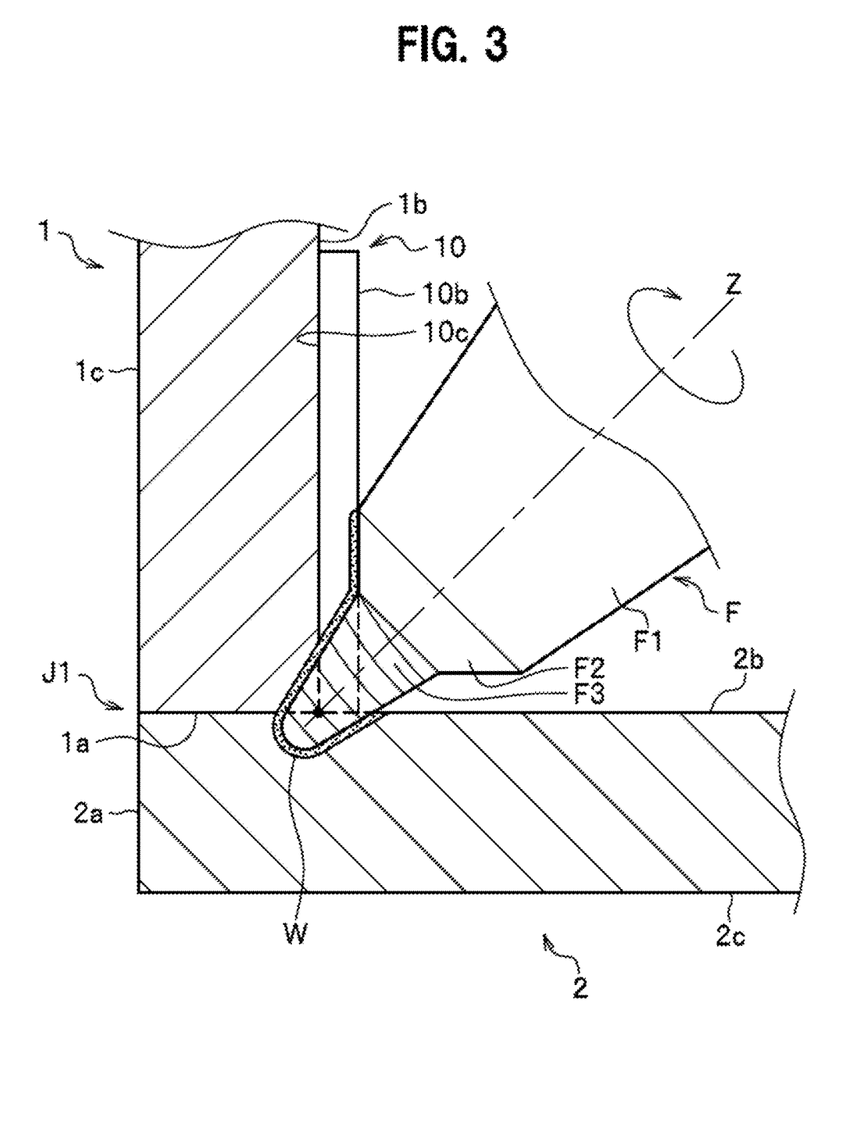
FIG. 3 is a cross sectional view showing a friction stirring process of the joining method according to the first embodiment.

As shown in FIG. 3, the friction stirring process is a process in which friction stir welding is performed with use of the rotary tool F to the inner corner portion formed of the first metal member 1 and the second metal member 2. In the friction stirring process, the tip side pin F3 is inserted into the inner corner portion while the tip side pin F3 is inserted from a front face 10b side of the auxiliary member 10 in a state where a rotational axis Z of the rotary tool F is inclined toward the second metal member 2 side. An insertion depth and an insertion angle of the tip side pin F3 are set so as to reach the butted portion J1. Further, the rotary tool F is moved along the inner corner portion in a state where an outer circumferential face of the base side pin F2 is pressed against the front face 10b of the auxiliary member 10. In the friction stirring process, the base side pin F2 is set so that an axial portion or the whole of the base side pin F2 is brought into contact with the auxiliary member 10. A plasticized region W is formed along a moving track of the rotary tool F.

The auxiliary member removing process is a process to cut the auxiliary member 10 after the friction stirring process is finished. In addition, a burr removing process to remove burrs may be performed if necessary. Through the above-said processes, the first metal member 1 and the second metal member 2 are joined to each other in the right angle shape.

Here, even if the auxiliary member 10 is fixed with use of a jig when friction stir welding is performed to the inner corner portion, there is a concern that the auxiliary member 10 is deformed by the frictional heat and insertion force of the rotary tool F in a direction where the auxiliary member 10 is separated from the first metal member 1. Furthermore, there is also a concern that the rotary tool F goes off the set moving route because the rotary tool F is pushed by the auxiliary member 10 because of the deformation of the auxiliary member 10.

However, in this embodiment, friction stir welding is performed in a state where the outer circumferential face of the base side pin F2 of the rotary tool F is pressed against the front face 10b of the auxiliary member 10. Hereby, the deformation of the auxiliary member 10 can be prevented. Further, the rotary tool F is guided along the auxiliary member 10 by pressing the outer circumferential face of the base side pin F2 against the front face 10b of the auxiliary member 10. Thus, the rotary tool F can be prevented from going off the set moving route.

Further, the base side pin F2 has not a spiral groove on the outer circumferential face and the outer circumferential face is smooth. Hereby, the rotary tool F can be smoothly moved along the auxiliary member 10 to enhance the guiding function.

Furthermore, the auxiliary member 10 is provided, and friction stir welding is performed to the first metal member 1, the second metal member 2, and the auxiliary member 10 with use of the rotary tool F. Thus, the metal shortage at the joining portion can be prevented. And by performing the auxiliary member removing process, the inner corner portion can be cleanly finished.

In the friction stirring process of this embodiment, friction stirring is performed while the auxiliary member 10 is disposed on the left side with respect to an advancing direction of the rotary tool F and the rotary tool F is rotated clockwise. That is, in this embodiment, the friction stirring process is performed in a state where the auxiliary member 10 is disposed on a shear side. In a case where the friction stirring process is performed in a state where the auxiliary member 10 is disposed on the shear side, there is a merit that the auxiliary member 10 can be easily cut after the friction stirring process.

Note that, in the friction stirring process, friction stirring may be performed while the auxiliary member is disposed on the right side with respect to the advancing direction of the rotary tool F and the rotary tool F is rotated clockwise. That is, friction stirring may be performed in a state where the auxiliary member 10 is disposed on a flow side. In a case where the friction stirring process is performed in a state where the auxiliary member 10 is disposed on the flow side, there are merits that a throat thickness to be formed at the inner corner portion can be relatively enlarged and burrs can be reduced.

Note that, a shear side (advancing side) means a side where a relative velocity at the outer circumference of the rotary tool with respect to a portion to be joined is obtained by adding the advancing speed to the tangential speed at the outer circumference of the rotary tool. On the other side, a flow side (retreating side) means a side where a relative velocity with respect to the portion to be joined at the outer circumference of the rotary tool becomes lower because the rotary tool rotates in the direction opposite to the advancing direction of the rotary tool.

Second Embodiment

Figure 4:
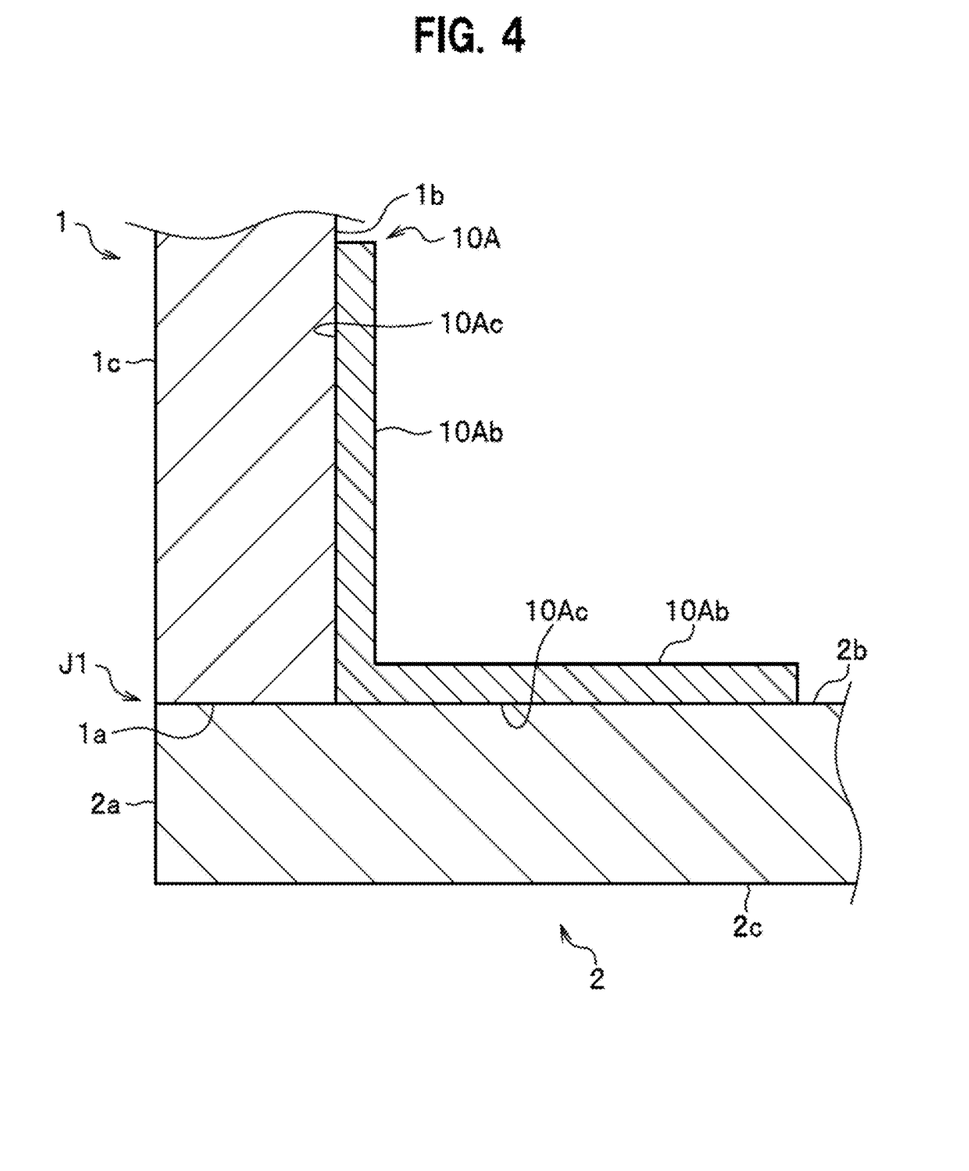
FIG. 4 is a cross sectional view showing a butting process and a disposing process of a joining method according to a second embodiment of the present invention.

Next, a joining method according to a second embodiment of the present invention will be described. In the joining method according to the second embodiment, a shape of the auxiliary member 10A differs from that of the first embodiment. In this embodiment, parts different from the first embodiment will be mainly described.

In the joining method according to this embodiment, a butting process, a disposing process, a friction stirring process, and an auxiliary member removing process are performed. The butting process is the same as that of the first embodiment.

In the disposing process, the auxiliary member 10A is disposed as shown in FIG. 4. The auxiliary member 10A is a plate-like member having an L-shaped cross section, the inner angle of which is 90°. In the disposing process, back faces 10Ac and 10Ac of the auxiliary member 10A are brought into contact with the side face 1b of the first metal member 1 and the side face 2b of the second metal member 2, respectively, and they are fixed not to move with use of a jig not shown.

Figure 5:
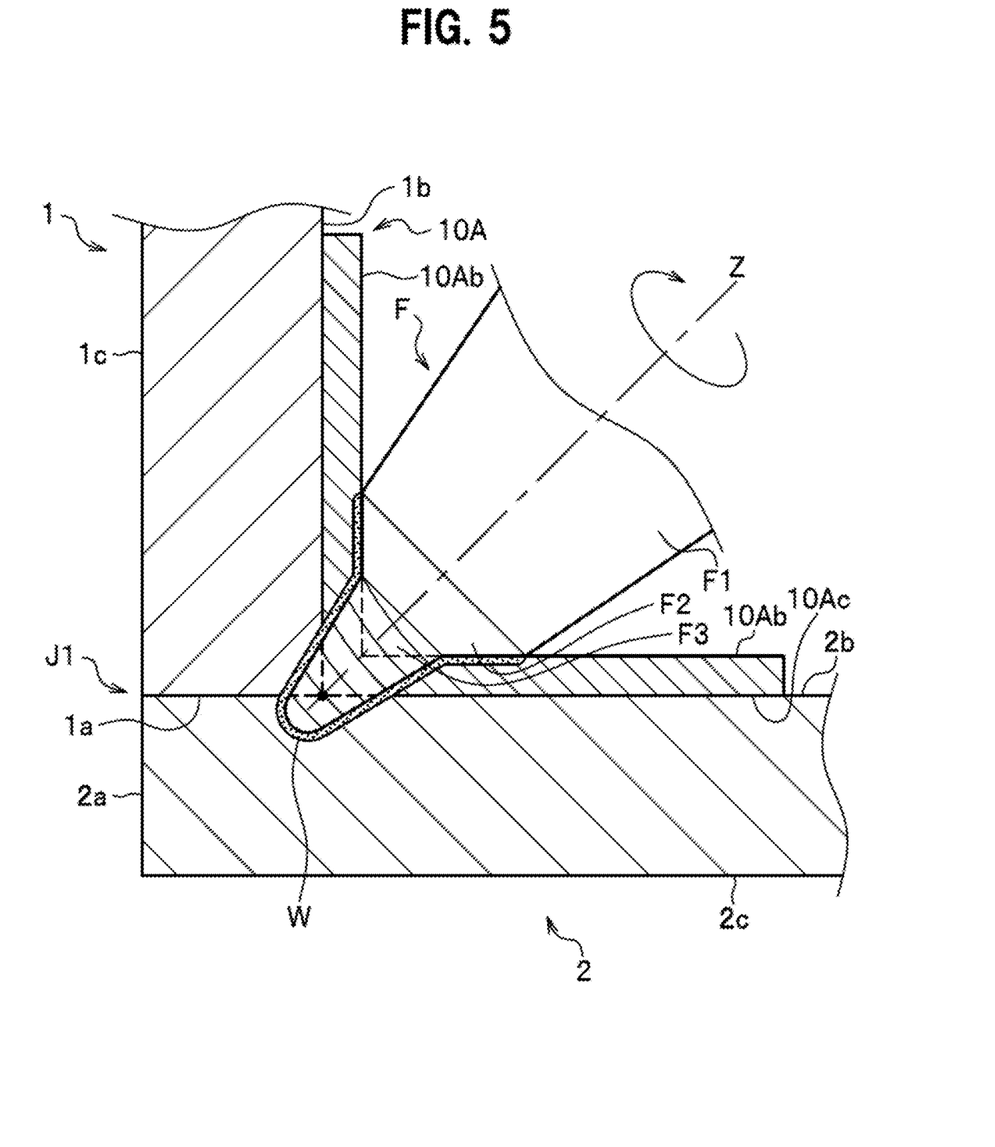
FIG. 5 is a cross sectional view showing a friction stirring process of the joining method according to the second embodiment.

The friction stirring process is a process in which friction stir welding is performed to the inner corner portion formed of the first metal member 1 and the second metal member 2 with use of the rotary tool F as shown in FIG. 5. In the friction stirring process, the tip side pin F3 is inserted into the inner corner portion while the tip side pin F3 is inserted from a front face 10Ab side of the auxiliary member 10 in a state where the rotational axis Z of the rotary tool F is inclined toward the second metal member 2 side. An insertion depth and an insertion angle of the tip side pin F3 are set to reach the butted portion J1.

The rotary tool F is moved along the inner corner portion in a state where the outer circumferential face of the base side pin F2 is pressed against both of the front faces 10Ab, 10Ab of the auxiliary member 10. That is, friction stirring is performed in a state where the outer circumferential face of the base side pin F2 is in contact with the two front faces 10Ab, 10Ab which form the auxiliary member 10A. In the friction stirring process, the base side pin F2 is set so that an axial portion or the whole of the base side pin F2 is brought into contact with both of the front faces 10Ab, 10Ab of the auxiliary member 10A. A plasticized region W is formed at the moving track of the rotary tool F.

In the auxiliary member removing process, after the friction stirring process is finished, the remaining auxiliary member 10A is cut.

According to this embodiment described in the above, friction stir welding is performed in a state where the outer circumferential face of the base side pin F2 of the rotary tool F is pressed against the front faces 10Ab, 10Ab of the auxiliary member 10. Hereby, the deformation of the auxiliary member 10A can be prevented. Further, by pressing the outer circumferential face of the base side pin F2 against both of the front faces 10Ab, 10Ab of the auxiliary member 10, the rotary tool F is more stably guided along the auxiliary member 10. Thus, the rotary tool F can be more steadily prevented from going off the set moving route.

Furthermore, the base side pin F2 has not a spiral groove on the outer circumferential face thereof and has a smooth outer circumferential face. Hereby, the rotary tool F can move smoothly along the auxiliary member 10A to enhance the guiding function.

Further, the auxiliary member 10 is provided, and friction stir welding is performed to the first metal member 1, the second metal member 2, and the auxiliary member 10 with use of the rotary tool F. Thus, the metal shortening at the joining portion can be prevented. And more, by performing the auxiliary member removing process, the inner corner portion can be cleanly finished.

Furthermore, in the friction stirring process of this embodiment, the auxiliary member 10A exists on both sides with respect to the advancing direction of the rotary tool F. Therefore, the metal shortage at the joining portion can be more steadily prevented.

Third Embodiment

Figure 6:
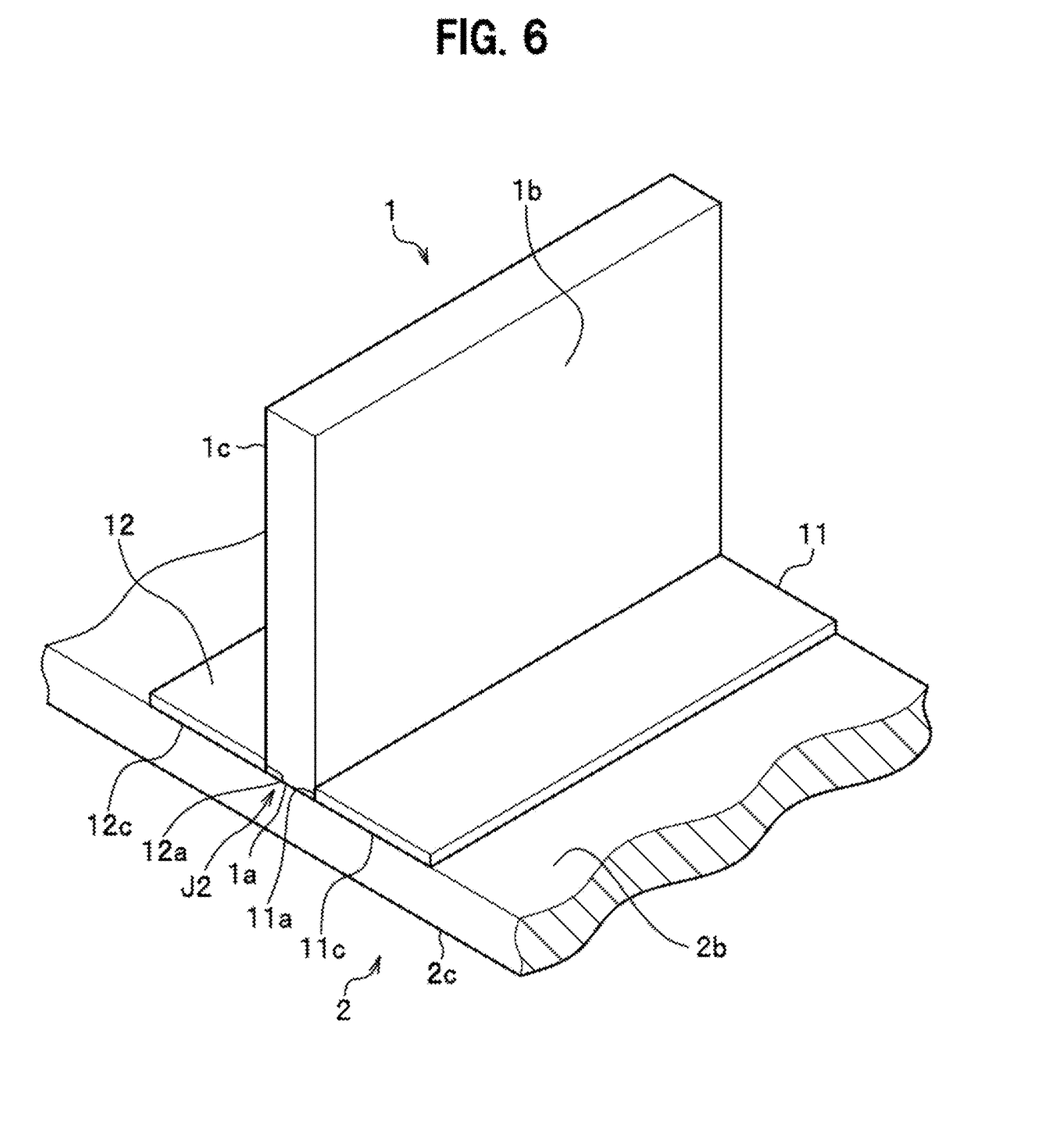
FIG. 6 is a perspective view showing a butting process and a disposing process of a joining method according to a third embodiment of the present invention.

Next, a joining method according to a third embodiment of the present invention will be described. In the joining method according to the third embodiment, a butting process, a disposing process, a friction stirring process, and an auxiliary member removing process are performed. In the butting process, the first metal member 1 and the second metal member 2 are butted against each other in an orthogonal relationship to have a T-shaped cross section as shown in FIG. 6. In the butting process, the end face 1a of the first metal member 1 and the front face 2b of the second metal member 2 are butted against each other to form a butted portion J2.

One side inner corner portion is formed of the side face 1b of the first metal member 1 and the side face 2b of the second metal member 2. And the other side inner corner portion is formed of the side face 1c of the first metal member 1 and the side face 2b of the second metal member 2.

The disposing process is a process in which auxiliary members 11 and 12 are disposed at the one side inner corner portion and the other side inner corner portion, respectively. Each of the auxiliary members 11 and 12 is a plate-like metal member. In this embodiment, an end face 11a of the auxiliary member 11 is brought into contact with the side face 1b of the first metal member 1 and a back face 11c of the auxiliary member 11 is brought into contact with the side face 2b of the second metal member 2. Further, an end face 12a of the auxiliary member 12 is brought into contact with the side face 1c of the first metal member 1, and a back face 12c of the auxiliary member 12 is brought into contact with the side face 2b of the second metal member 2.

Figure 7:
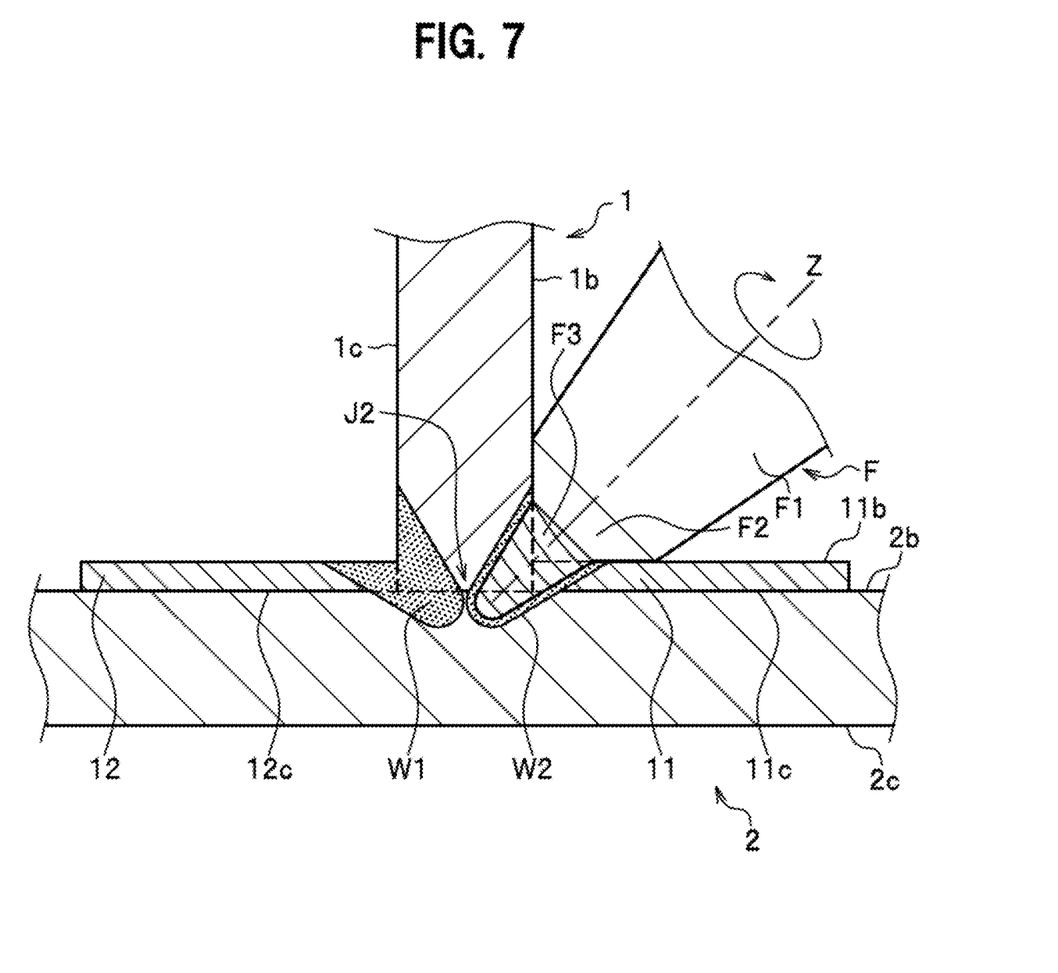
FIG. 7 is a cross sectional view showing a friction stirring process of the joining method according to the third embodiment.

As shown in FIG. 7, the friction stirring process is a process in which friction stir welding is performed with use of the rotary tool F to the one side inner corner portion and the other side inner corner portion which are formed of the first metal member 1 and the second metal member 2. In the friction stirring process, the tip side pin F3 is inserted into the one side inner corner portion while the tip side pin F3 is inserted from a front face 11b side of the auxiliary member 11 in a state where the rotational axis Z of the rotary tool F is inclined toward the second metal member 2 side. An insertion depth and an insertion angle of the tip side pin F3 are set to reach the butted portion J1. Further, the rotary tool F is moved along the inner corner portion in a state where the outer circumferential face of the base side pin F2 is pressed against the front face 11b of the auxiliary member 11.

In the friction stirring process, the base side pin F2 is set so that an axial portion or the whole of the base side pin F2 is brought into contact with the auxiliary member 11. A plasticized region W2 is formed at the moving track of the rotary tool F. In this embodiment, each of the auxiliary members 11, 12 is disposed on the right side with respect to the corresponding advancing direction and the rotary tool F is rotated clockwise. That is, an advancing direction and a rotational direction of the rotary tool F are set so that the auxiliary members 11, 12 are respectively located on the flow side. Note that, friction stirring is performed also to the other side inner corner portion in the same manner as to the one side inner corner portion.

Even the third embodiment described in the above can have almost the same effect as the first embodiment. Further, the first metal member 1 and the second metal member 2 can be joined to be in the T-shaped state like this embodiment. Still further, even in this embodiment, friction stirring process may be performed in a state of disposing the auxiliary member 10A having the L-shaped cross section. Furthermore, an insertion angle of the rotary tool F and a length of the tip side pin F3 may be set so that the whole of the butted portion J2 can be frictionally stirred. That is, they may be set so that plasticized regions W1, W2 are brought into contact with each other at the butted portion J2.

EXAMPLES

Figure 8:
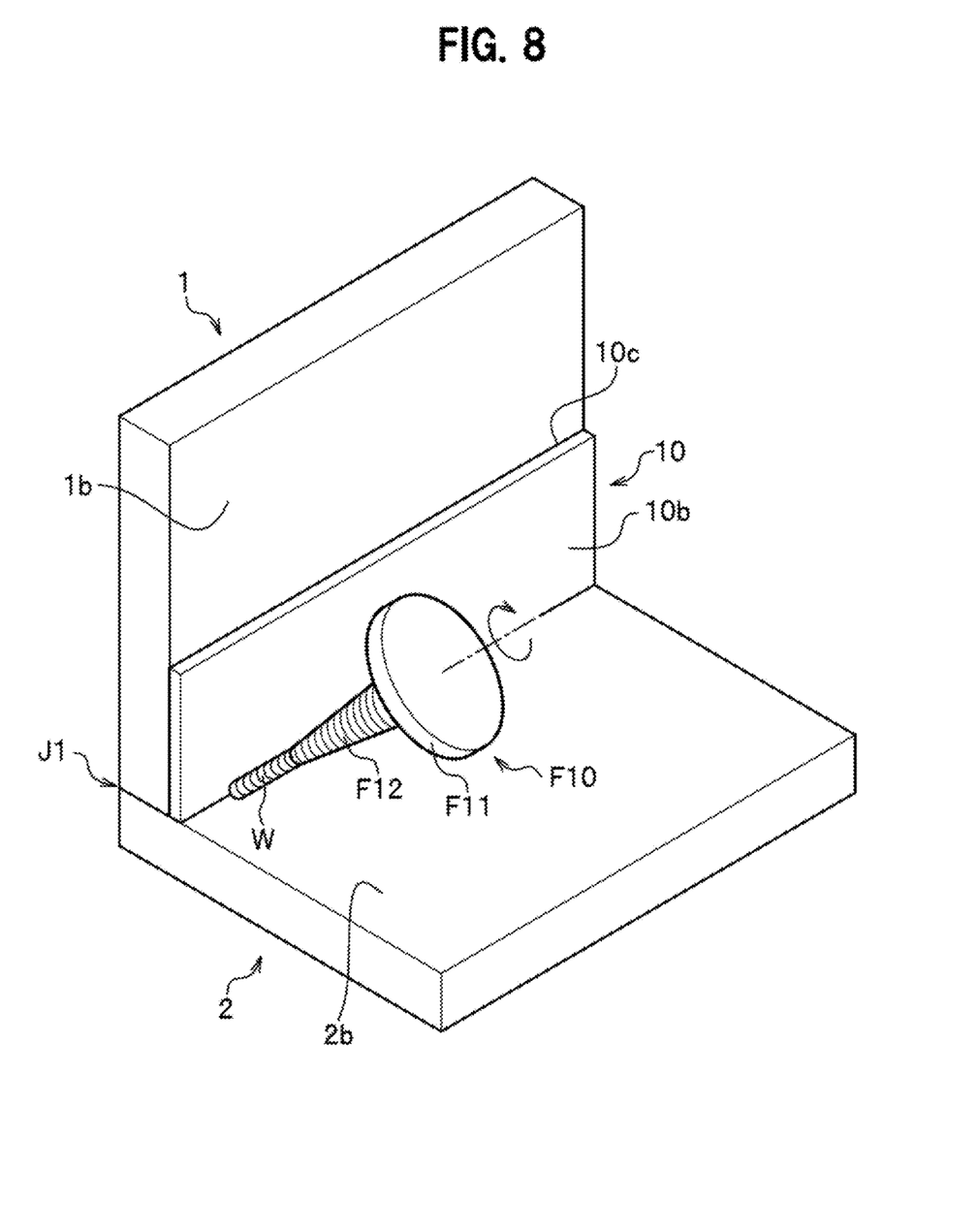
FIG. 8 is a perspective view showing a joining method according to a comparative example 1.

Next, a comparative example 1, a comparative example 2, an example 1, and an example 2 according to the present invention will be described. FIG. 8 is a perspective view showing a joining method according to the comparative example 1.

Comparative Example 1

The comparative example 1 has a purpose to confirm a deformation of the auxiliary member after friction stir welding. As shown in FIG. 8, in the comparative example 1, friction stir welding is performed to the first metal member 1 and the second metal member 2 to make them orthogonal to each other with use of a rotary tool F10. Each of the first metal member 1 and the second metal member 2 is made of an aluminum alloy and has a thickness of 6 mm. The auxiliary member 10 is made of an aluminum alloy and has a thickness of 3 mm. The rotary tool F10 has a connecting portion F11 and a stirring pin F12 hanging down from the connecting portion F11. And the stirring pin F12 has a spiral groove formed on the outer circumferential face thereof.

In the comparative example, a butting process and a disposing process are performed in the same manner as those of the first embodiment of the present invention. The back face 10c of the auxiliary member 10 is in face-to-face contact with the side face 1b of the first metal member 1. In a friction stirring process, only the stirring pin F12 of the rotary tool F10 is inserted into the inner corner portion from the front face 10b side of the auxiliary member 10. An insertion depth and an insertion angle of the stirring pin F12 are set so that the tip of the stirring pin F12 reaches the butted portion J1. In the friction stirring process, the rotary tool F10 is moved along the inner corner portion (butted portion J1).

Figure 9:
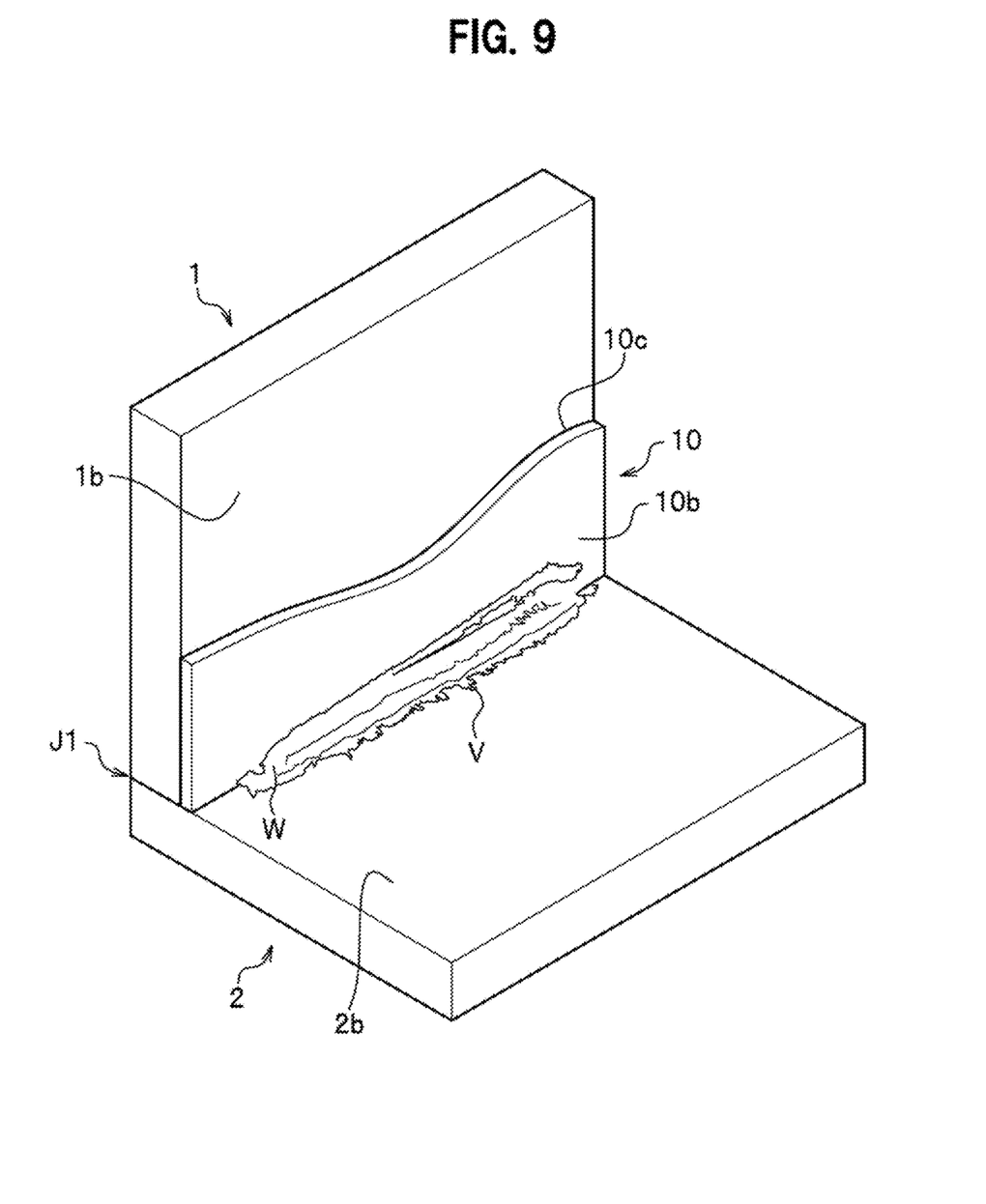
FIG. 9 is a perspective view showing a state after friction stir welding in the joining method according to the comparative example 1.

FIG. 9 is a perspective view showing a state after friction stir welding in the joining method according to the comparative example 1. As shown in FIG. 9, the auxiliary member 10 is deformed because of the frictional heat and insertion force in the friction stirring process to project in a direction to separate from the first metal member 1 even though the auxiliary member 10 is fixed with a jig not shown together with the first metal member 1 and the second metal member 2. In the case of the friction stirring process of the comparative example 1, the auxiliary member 10 is deformed in the friction stirring. Thus, the rotary tool F10 goes off the desirable set moving route because the rotary tool F10 is pushed by the auxiliary member 10. As a result, there is a problem that the poor joining occurs. Furthermore, some suitable amount of metal is not supplied because the auxiliary member 10 is deformed, so that the metal shortage at the joining portion occurs and many burrs V are generated.

Comparative Example 2

Figure 10:
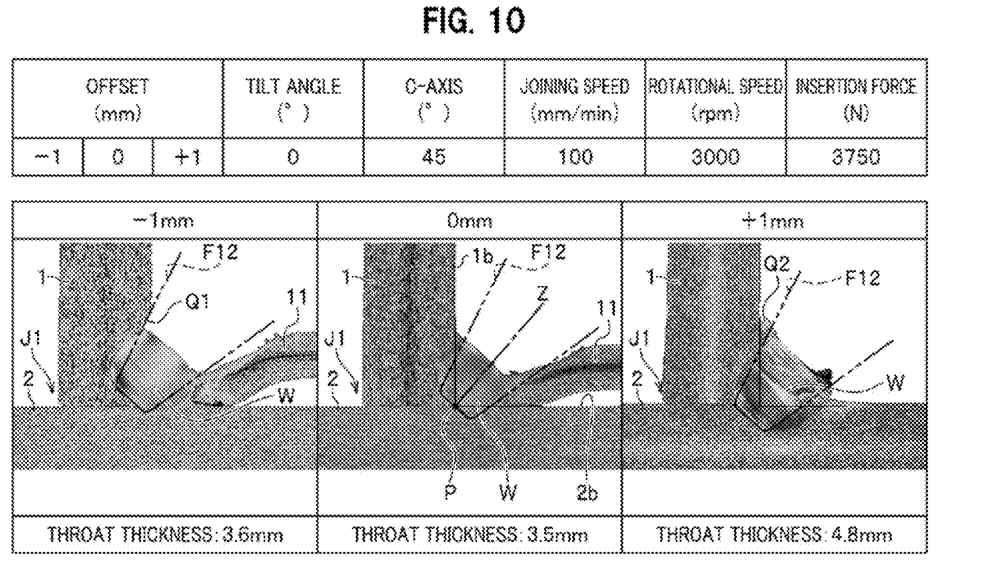
FIG. 10 is a schematic view showing a joining method according to a comparative example 2.

The comparative example 2 has a purpose to confirm effects that an insertion position of the rotary tool 10 affects the joining portion. FIG. 10 is a schematic view showing a joining method according to the comparative example 2. As shown in FIG. 10, in the comparative example 2, the first metal member 1 and the second metal member 2 are joined so that they have a T-shaped cross section. In a friction stirring process, the rotary tool F10 (refer to FIG. 8) is used. Each of the first metal member 1 and the second metal member 2 is made of an aluminum alloy and has a thickness of 6 mm. An auxiliary member 11 is made of an aluminum alloy and has a thickness of 3 mm.

In the comparative example 2, friction stir welding was performed with each condition shown in FIG. 10. That is, in the comparative example 2, a tilt angle was set to 0° and a C-axis was set to 45°. The tilt angle is an inclined angle of the rotary tool F10 with respect to an advancing direction of the rotary tool F10. The C-axis is an opening angle of the rotational axis Z of the stirring pin F12 with respect to the side face 2b of the second metal member 2. Further, in the comparative example 2, the joining speed was set to 100 mm/min, the rotational speed was set to 3000 rpm, and the insertion force was set to 3750 N.

In the comparative example 2, an insertion position (offset) of the rotary tool F10 was set to −1 mm, 0 mm, +1 mm. The insertion position of 0 mm of the rotary tool F10 means that the rotational axis Z passes through a corner portion P formed of the side face 1b of the first metal member 1 and the side face 2b of the second metal member 2. The offset amount of −1 mm means a position which horizontally shifted by 1 mm from the position where the offset amount is 0 toward the first metal member 1 side. The offset amount of +1 mm means a position which horizontally shifted by 1 mm from the position where the offset amount is 0 toward the side separating from the first metal member 1. Note that, the reference sign 11 in FIG. 10 designates an auxiliary member after joining. In the case of the offset amount of +1 mm, the auxiliary member 11 spontaneously fell off after friction stirring process.

As shown in FIG. 10, in the case of the offset amount of 0 mm, the cross section of the joining portion is also good. However, in the case of the offset amount of −1 mm, a recessed groove Q1 is formed in an extension direction. In the case of the offset amount of +1 mm, a notch Q2 is formed in the extension direction. Namely, judging from the comparative example 2, it can be understood that there is a high concern about poor joining simply by shifting the set moving route by 1 mm.

Example 1

Figure 11:
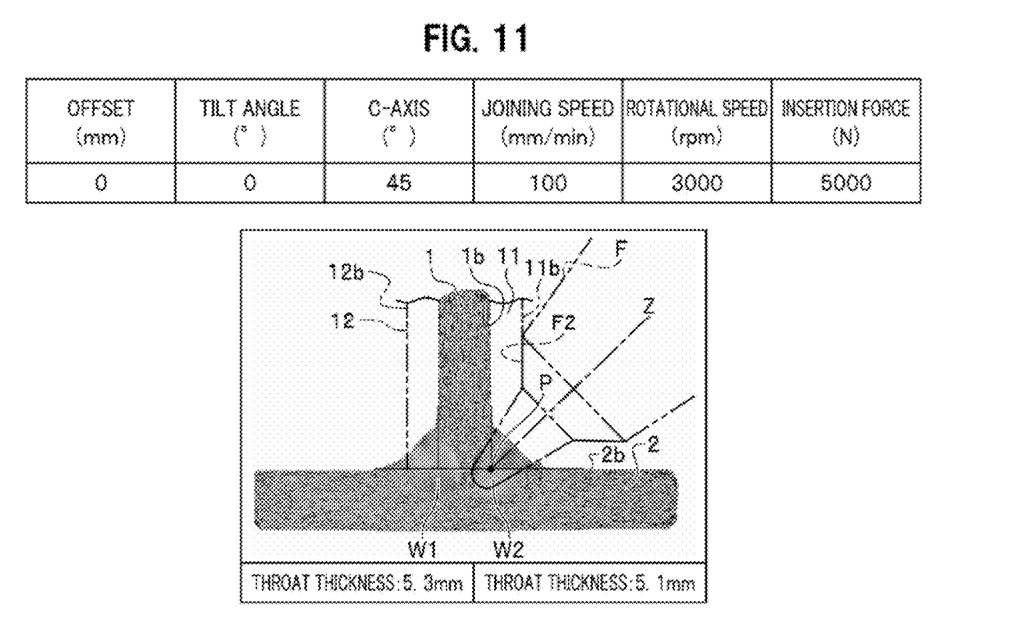
FIG. 11 is a schematic view showing a joining method according to an example 1.

FIG. 11 is a schematic view showing a joining method according to the example 1. In the example 1, friction stir welding was performed to the first metal member 1 and the second metal member 2 with use of the rotary tool F according to the present invention to have a T-shaped cross section. Each of the first metal member 1 and the second metal member 2 is made of an aluminum alloy and has a thickness of 6 mm. Each of the auxiliary members 11 and 12 is made of an aluminum alloy and has a thickness of 3 mm.

Joining conditions for the rotary tool F were set so that the auxiliary members 11, 12 are located on the shear side. In the friction stirring process, the rotary tool F was moved while the outer circumferential face of the base side pin F2 of the rotary tool F was pressed against the front face 11b of the auxiliary member 11 and the front face 12b of the auxiliary member 12.

As shown in FIG. 11, in the example 1, the tilt angle was set to 0°, the C-axis was set to 45°, the joining speed was set to 100 mm/min, the rotational speed was set to 3000 rpm, the insertion force was set to 5000 N, and the offset amount was set to 0 mm. That is, friction stirring was performed in the state where the rotational axis Z of the rotary tool F passed through the corner portion P formed of the side face 1b of the first metal member 1 and the side face 2b of the second metal member 2.

As shown in FIG. 11, cross sections (plasticized regions W1, W2) of the joining portions in the example 1 were both good.

Example 2

Figure 12:
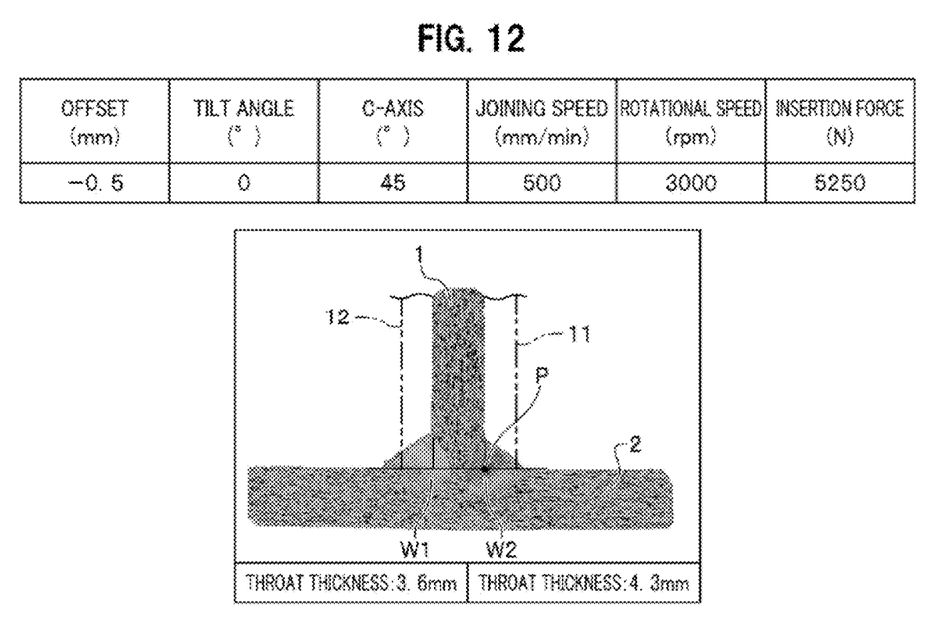
FIG. 12 is a schematic view showing a joining method according to an example 2.

FIG. 12 is a schematic view showing a joining method according to the example 2. In the example 2, the tilt angle was set to 0°, the C-axis was set to 45°, the joining speed was set to 500 mm/min, the rotational speed was set to 3000 rpm, and the insertion force was set to 5250 N. An offset amount of −0.5 mm means that the rotational axis Z shifts by 0.5 mm from the corner portion P toward the first metal member 1 side (left side in the FIG.). In also the example 2, cross sections (plasticized regions W1, W2) of the joining portions were both good.

The throat thickness in the example 1 was relatively larger than that in the example 2. It is considered that this is because the joining speed in the example 1 was lower than that in the example 2.

REFERENCE SIGNS LIST

1 First metal member
1b Front face
1c Back face
2 Second metal member
2b Front face
2c Back face
10 Auxiliary member
F Rotary tool
F1 Base portion
F2 Base side pin
F3 Tip side pin
W Plasticized region

The invention claimed is:

1. A joining method by which a first metal member and a second metal member are joined to each other with use of a rotary tool,
wherein the rotary tool is provided with a base side pin and a tip side pin, the tip side pin has a spiral groove on an outer circumferential face thereof, the base side pin does not have a spiral groove on the outer circumferential face which is smooth, and a tapered angle of the base side pin is larger than a tapered angle of the tip side pin, the method comprising:
a butting process in which the first metal member and the second metal member are butted against each other so as to have an almost L-shaped or T-shaped cross section to form a butted portion;
a disposing process in which one auxiliary member is disposed at an inner corner portion formed of the first metal member and the second metal member so that the one auxiliary member is brought into face-to-face contact with the first metal member or the second metal member; and
a friction stirring process in which the first metal member, the second metal member, and the auxiliary member are joined to one another by moving the rotary tool along the inner corner portion in a state where the tip side pin which is being rotated is inserted into the inner corner portion, is in contact with the first metal member, the second metal member, and the auxiliary member, and the outer circumferential face of the base side pin is pressed against the auxiliary member.

2. The joining method according to claim 1, further comprising an auxiliary member removing process in which the auxiliary member is removed from the inner corner portion after the friction stirring process.

3. A joining method by which a first metal member and a second metal member are joined to each other with use of a rotary tool,
wherein the rotary tool is provided with a base side pin and a tip side pin, the tip side pin has a spiral groove on an outer circumferential face thereof, the base side pin does not have a spiral groove on the outer circumferential face which is smooth, and a tapered angle of the base side pin is larger than a tapered angle of the tip side pin, the method comprising:
a butting process in which the first metal member and the second metal member are butted against each other so as to have an almost L-shaped or T-shaped cross section to form a butted portion;
a disposing process in which an auxiliary member is disposed at an inner corner portion formed of the first metal member and the second metal member so that the auxiliary member is brought into face-to-face contact with the first metal member and the second metal member; and
a friction stirring process in which the first metal member, the second metal member, and the auxiliary member are joined to one another by moving the rotary tool along the inner corner portion in a state where the tip side pin which is being rotated is inserted into the inner corner portion, is in contact with the first metal member, the second metal member, and the auxiliary member, and the outer circumferential face of the base side pin is pressed against the auxiliary member.

4. The joining method according to claim 3, further comprising an auxiliary member removing process in which the auxiliary member is removed from the inner corner portion after the friction stirring process.

* * * * *